United States Patent
Mei et al.

(10) Patent No.: US 11,415,216 B2
(45) Date of Patent: Aug. 16, 2022

(54) DETERMINATION OF LOAD FACTOR FOR VEHICLE WITH PARK ACTUATOR MOTOR

(71) Applicant: GM GLOBAL TECHNOLOGY OPERATIONS LLC, Detroit, MI (US)

(72) Inventors: Qiang Mei, Novi, MI (US); Vijay A. Neelakantan, Rochester Hills, MI (US); Young Joo Lee, Rochester, MI (US); Brian A. Welchko, Oakland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 303 days.

(21) Appl. No.: 16/807,758

(22) Filed: Mar. 3, 2020

(65) Prior Publication Data

US 2021/0277992 A1 Sep. 9, 2021

(51) Int. Cl.
| | |
|---|---|
| *F16H 63/48* | (2006.01) |
| *F16H 59/50* | (2006.01) |
| *F16H 61/20* | (2006.01) |
| *F16H 63/34* | (2006.01) |

(52) U.S. Cl.
CPC ............. *F16H 59/50* (2013.01); *F16H 61/20* (2013.01); *F16H 63/3466* (2013.01); *F16H 63/48* (2013.01); *F16H 63/3483* (2013.01); *F16H 2061/205* (2013.01)

(58) Field of Classification Search
CPC .............. F16H 61/32; F16H 2061/323; F16H 2061/326; F16H 63/48; F16H 63/3466; F16H 63/3483; F16H 59/50; F16H 59/52
See application file for complete search history.

(56) References Cited

U.S. PATENT DOCUMENTS

| | | | |
|---|---|---|---|
| 7,270,027 B2 | 9/2007 | Berger et al. | |
| 2013/0305863 A1* | 11/2013 | Weslati | F16H 63/48 74/411.5 |
| 2015/0000450 A1* | 1/2015 | Yatou | F16H 59/105 74/473.12 |
| 2016/0025214 A1* | 1/2016 | Yoshida | F16H 63/48 701/45 |
| 2018/0100581 A1 | 4/2018 | Neelakantan et al. | |
| 2018/0112774 A1 | 4/2018 | Littlefield et al. | |
| 2019/0131896 A1* | 5/2019 | Kamio | F16H 61/32 |
| 2020/0032902 A1 | 1/2020 | Neelakantan et al. | |

* cited by examiner

*Primary Examiner* — Ernesto A Suarez
*Assistant Examiner* — Lori Wu
(74) *Attorney, Agent, or Firm* — Quinn IP Law

(57) ABSTRACT

An apparatus and a method for controlling operation of a vehicle includes a controller having a processor and a tangible, non-transitory memory. The vehicle includes a park assembly with a park actuator motor having an actuator shaft. The vehicle has a park mode and an out-of-park mode. The controller is configured to determine if the park actuator motor has reached an out-of-park position when a shift command to the out-of-park mode is received. The controller is configured to obtain and store at least one dynamic parameter associated with the park actuator motor prior to the detent member reaching the out-of-park position. The method includes determining a load factor based on the dynamic parameter over time when at least one of a predefined time threshold and a predefined motor position threshold is reached. Operation of the vehicle is controlled based at least partially on the load factor.

16 Claims, 4 Drawing Sheets

DETERMINATION OF LOAD FACTOR FOR VEHICLE WITH PARK ACTUATOR MOTOR

INTRODUCTION

The disclosure relates generally to controlling operation of a vehicle having a park actuator motor, and more particularly, to determination of a load factor based in part on the park actuator motor. A vehicle transmission generally operates in multiple modes of operation, including out-of-park driving modes and a park mode. The out-of-park driving modes may include a forward gear (i.e. a drive mode), at least one reverse gear (i.e. a reverse mode), and a neutral mode. Selection of the driving mode may be attained by several methods, such as for example, engagement of a shift lever. The driving mode may be selected through an electronic transmission range selection (ETRS) system, where the driving modes are selected through electronic signals communicated between a user interface device and the transmission. Transmission range selection systems may include an actuator motor for moving various parts.

SUMMARY

Disclosed herein is a method for controlling operation of a vehicle having a park assembly, one or more sensors and a controller having a processor and a tangible, non-transitory memory. The vehicle has a park mode and an out-of-park mode. The method includes positioning a park actuator motor in the park assembly, the park actuator motor having an actuator shaft. The park actuator motor is rotated from a park position to an out-of-park position when a shift command to the out-of-park mode is received by the controller. The method includes determining if the park actuator motor has reached the out-of-park position when the shift command is received, via the controller. The method includes obtaining and storing at least one dynamic parameter associated with the park actuator motor prior to the park actuator motor reaching the out-of-park position, via the controller. The method includes determining a load factor based on the at least one dynamic parameter when at least one of a predefined time threshold and a predefined motor position threshold is reached, via the controller. Operation of the vehicle is controlled based at least partially on the load factor, via the controller.

Disclosed herein is a vehicle having a park mode and an out-of-park mode, the vehicle including a park assembly with a park actuator motor having an actuator shaft. One or more sensors are configured to obtain respective sensor data relative to the park assembly. A controller is in communication with the one or more sensors and having a processor and a tangible, non-transitory memory on which is instructions are recorded. The park actuator motor is configured to move from a park position to an out-of-park position when a shift command to the out-of-park mode is received by the controller. Execution of the instructions by the processor causes the controller to determine if the park actuator motor has reached the out-of-park position when the shift command is received. The controller is configured to obtain and store at least one dynamic parameter associated with the park actuator motor prior to the park actuator motor reaching the out-of-park position, via the one or more sensors. The controller is configured to determine a load factor based on the at least one dynamic parameter over time when at least one of a predefined time threshold and a predefined motor position threshold is reached. Operation of the vehicle is controlled based at least partially on the load factor.

Controlling operation of the vehicle may include determining if the load factor is below a first calibrated threshold and generating a diagnostic signal when the load factor is below the first calibrated threshold, via the controller. Controlling operation of the vehicle may include determining if the load factor is below a second calibrated threshold, the second calibrated threshold being less than the first calibrated threshold, and activating a propulsion motor to assist the park assembly when the load factor is below the second calibrated threshold.

A motor position signal may be selected as the at least one dynamic parameter, via the controller, the load factor being an integration of the motor position signal over time. A current signal may be selected as the at least one dynamic parameter, via the controller, the load factor being at least one of an integration of the current signal over time and the current signal in steady state. The controller is configured to obtain (or the method may include obtaining) a grade for the vehicle in real-time based at least partially on the load factor and a weight of the vehicle. The controller is configured to obtain (or the method may include obtaining) an input voltage signal to the park actuator motor and normalize the load factor to the input voltage signal.

The method may include mounting a park gear on a transmission output shaft of the vehicle and mounting a detent member on the actuator shaft. The method may include coupling a park pawl to the detent member, the park pawl being configured to selectively engage with the park gear. The method may include engaging the park pawl with the park gear when the park actuator motor is in the park position and disengaging the park pawl from the park gear when the park actuator motor is in the out-of-park position.

The vehicle may include a detent member mounted on the actuator shaft, the detent member being operatively connected to a transmission output shaft. The vehicle may include a park gear mounted on the transmission output shaft and a park pawl configured to selectively engage with the park gear. The park pawl is configured to engage with the park gear when the park actuator motor is in the park position and the park pawl is configured to disengage from the park gear when the park actuator motor is in the out-of-park position.

The above features and advantages and other features and advantages of the present disclosure are readily apparent from the following detailed description of the best modes for carrying out the disclosure when taken in connection with the accompanying drawings.

DETAILED DESCRIPTION

Figure 1:
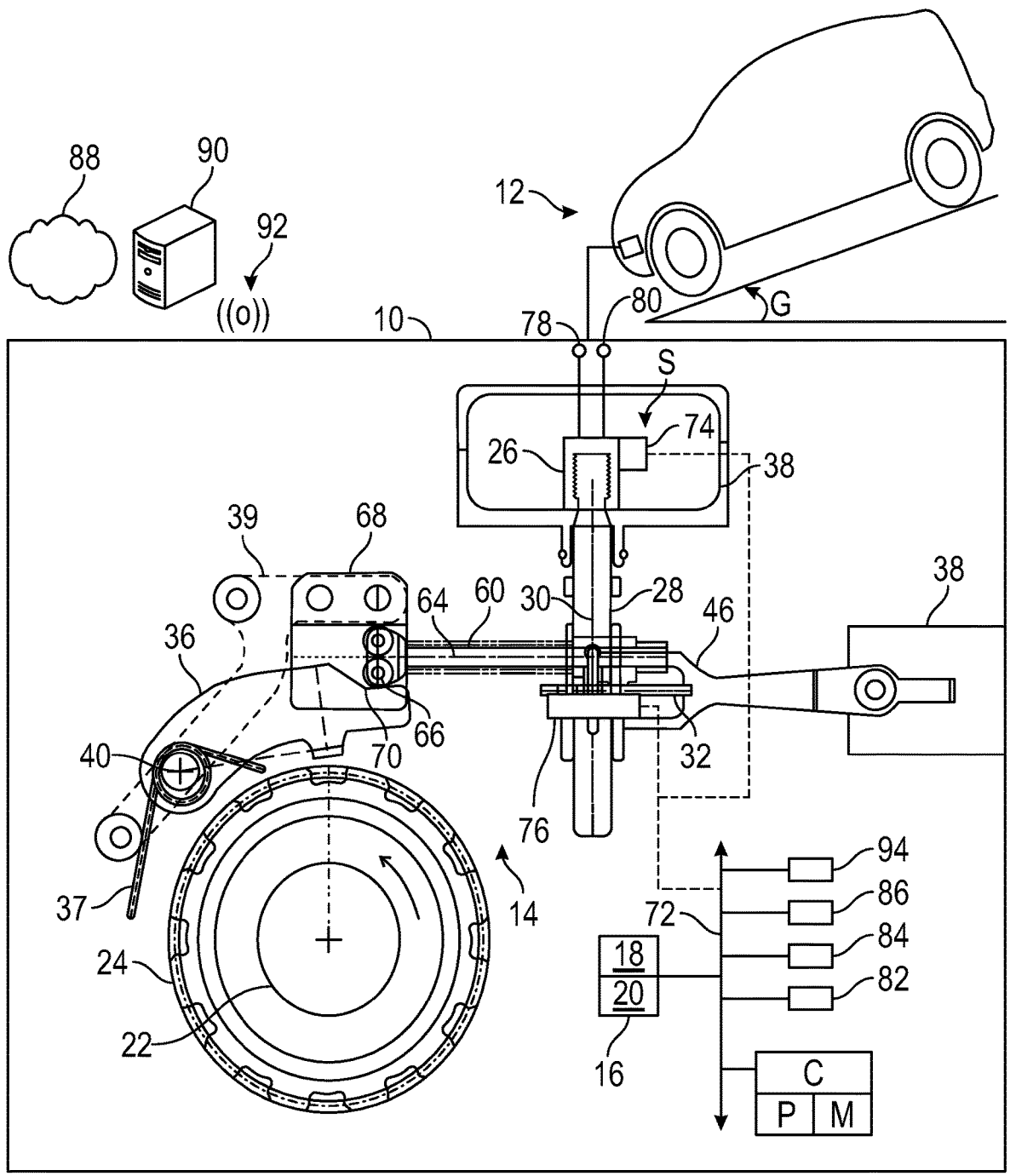
FIG. 1 is a schematic fragmentary side view of a system for controlling operation of a vehicle having a park assembly and a controller.

Referring to the drawings, wherein like reference numbers refer to like components, FIG. 1 schematically illustrates a system 10 for controlling operation of a vehicle 12 having a park assembly 14 (shown in a side view). The vehicle 12 may be a mobile platform, such as, but not limited to, a passenger vehicle, sport utility vehicle, light truck, heavy duty vehicle, ATV, minivan, bus, transit vehicle, bicycle, moving robot, farm implement (e.g. tractor), sports-related equipment (e.g. golf cart), boat, plane and train. While an example park assembly 14 is described herein, it is to be understood that the park assembly 14 may take many different forms and have additional components.

Referring to FIG. 1, the system 10 includes a controller C, which may be an integral portion of, or a separate module operatively connected to, other controllers of the vehicle 12. Referring to FIG. 1, the controller C is configured to receive respective shift commands to move between a plurality of operating modes of the vehicle 12, for example, shifting a transmission range 16 between a park mode 18 and an out-of-park mode 20. Referring to FIG. 1, the vehicle 12 includes a transmission output shaft 22. A park gear 24 is mounted on and rotates at the same speed as the transmission output shaft 22.

Figure 2A:
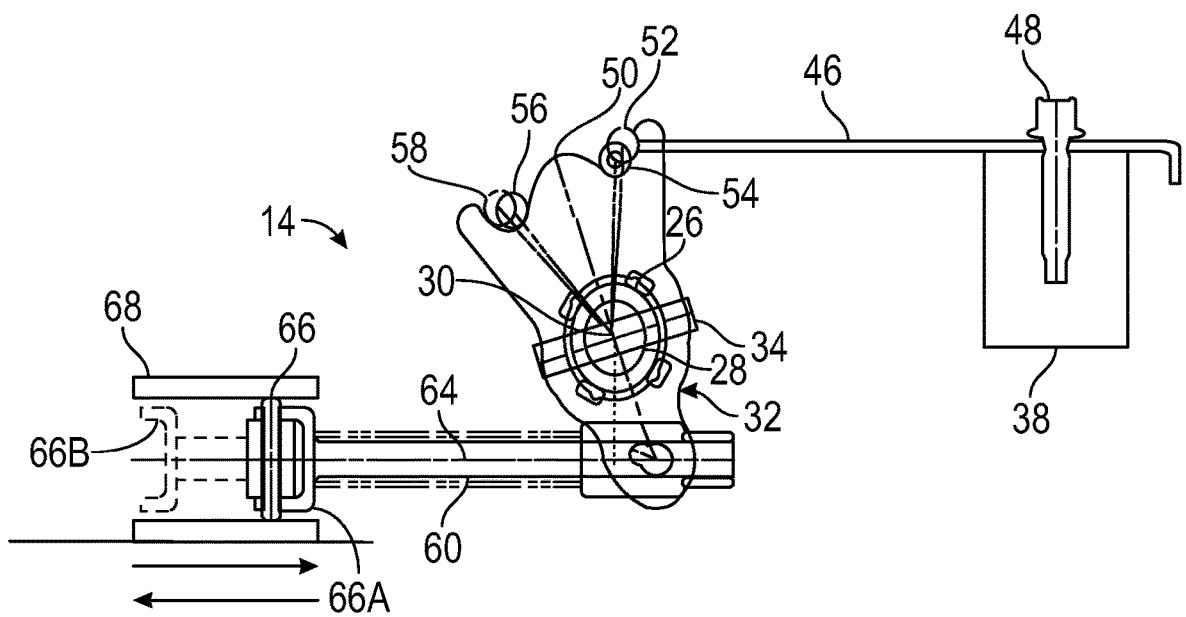
FIG. 2A is a schematic plan view of a portion of the park assembly shown in FIG. 1.

FIG. 2A is a schematic plan view of a portion of the park assembly 14. Referring to FIGS. 1 and 2, the park assembly 14 includes a park actuator motor 26, which is a DC electric motor splined to an actuator shaft 28 and configured to rotate the actuator shaft 28 about a first axis 30. A detent member 32 is operatively connected or mounted to the actuator shaft 28 by a roll pin 34. Referring to FIG. 1, the detent member 32 is coupled to a park pawl 36, the park pawl 36 being configured to selectively engage with the park gear 24, for example through respective splines on the park pawl and the park gear 24. The park gear 24 is supported on a stationary housing 38 (see FIGS. 1 and 2A), such that the transmission output shaft 22 extends out of an opening in the stationary housing 38. Referring to FIG. 1, the park pawl 36 is configured to pivot about a pivot axis 40. Referring to FIG. 1, the park pawl 36 may be biased in a specific position by a spring 37 mounted to the stationary housing 38 by a bracket 39 (shown in phantom).

Figure 2B:
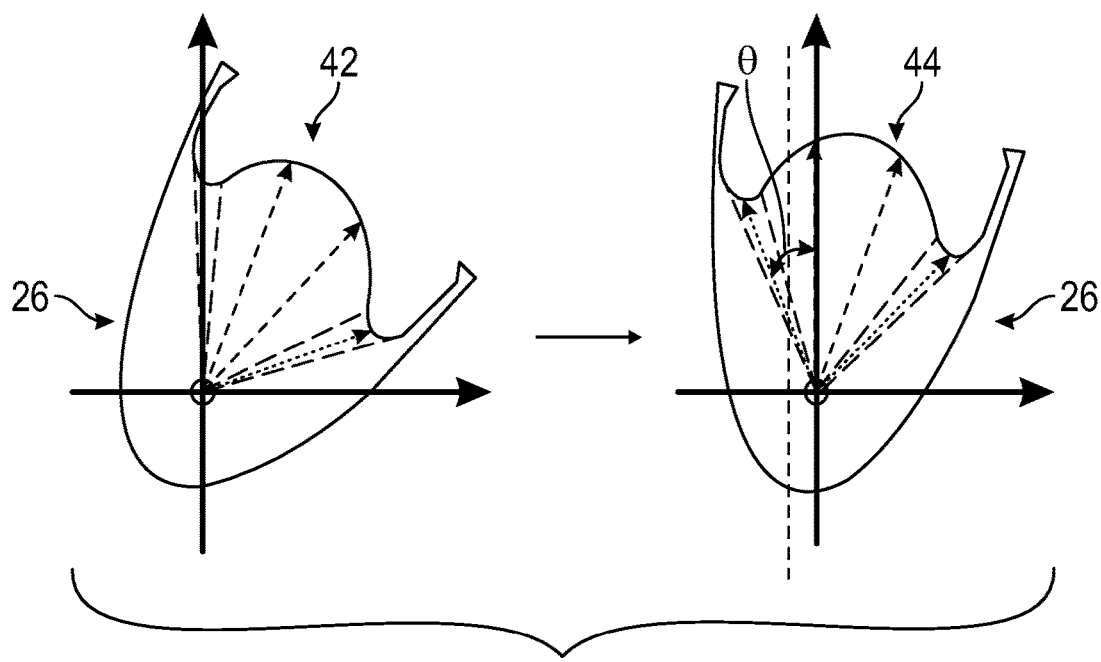
FIG. 2B is a schematic side view of various positions of a park actuator motor in the park assembly shown in FIG. 1.

FIG. 2B is a schematic view of two positions of the park actuator motor 26. When the controller C receives a shift command to the out-of-park mode 20, the park actuator motor 26 is configured to shift from a park position 42 (see FIG. 2B) to a current position 44 (see FIG. 2B), and gradually move towards an out-of-park position 45 (FIG. 1). Referring to FIG. 2B, the shift in the motor position of the park actuator motor 26 in real-time may be characterized by an angle θ.

Referring to FIG. 2A, a detent spring 46 is mounted at a fixed end to the stationary housing 38 by a bolt 48. The detent member 32 has two depressions or detents (between a hill 50) that are spaced approximately 45 degrees apart from one another. Referring to FIG. 2A, a rolling element 52 is biased by the detent spring 46 and moved between various positions 54, 56, 58 depending on the angular position of the actuator shaft 28.

Referring to FIG. 2A, the park assembly 14 may include an actuator rod 60 connected to the detent member 32 at an opposing end (of the actuator rod 60), with the actuator shaft 28 extending through the detent member 32. When the park actuator motor 26 causes the actuator shaft 28 to rotate, the detent member 32 moves angularly about the first axis 30 with the actuator shaft 28, causing a spring (not shown) on the actuator rod 60 to be compressed and the actuator rod 60 to move linearly along a second axis 64.

Referring to FIGS. 1 and 2A, one or more rolling elements 66 (e.g. roller bullets, sliding bullets or other suitable elements) at an end of the actuator rod 60 may be positioned inside a roller guide 68. The rolling elements 66 are configured to move along a surface 70 (see FIG. 1) of the park pawl 36 as the actuator rod 60 is translated. Referring to FIG. 2A, the rolling elements 66 may move between a first position 66A and a second position 66B.

Referring to FIG. 1, the controller C includes at least one processor P and at least one tangible, non-transitory memory M (or tangible, non-transitory computer readable storage medium) on which instructions are recorded for executing a method 100, described below with respect to FIG. 3. The memory M can store executable instruction sets, and the processor P can execute the instruction sets stored in the memory M. As described below, the method 100 uses the motor position (or winding current) and the input voltage of the park actuator motor 26 to estimate a load factor when the vehicle 12 is parked. The method 100 may be employed a grade G (see FIG. 1) of the vehicle 12. The load factor may be used to mitigate load issues from the grade G. The method 100 and system 10 provide a technical advantage of robustly obtaining load and grade information without requiring additional hardware. In other words, eliminating the need for a separate load sensor and/or grade sensor. Additionally, the method 100 and system 10 cover more mechanical variations than a grade sensor (not shown), such as variation in mechanical friction, aging and other factors.

Referring to FIG. 1, the controller C may be in communication with multiple entities via a communication BUS 72, which may be in the form of a serial Controller Area Network (CAN-BUS). The controller C is specifically configured to execute the blocks of method 100 and may receive input from one or more sensors S (see FIG. 1) configured to obtain respective sensor data relative to the park assembly 14. Referring to FIG. 1, the sensors S may include a position sensor 74 configured to determine the motor position of the park actuator motor 26. The motor position may also be obtained by a transmission range sensor 76 (see FIG. 1) mounted on the detent member 32. The position sensor 74 and transmission range sensor 76 may be a Hall Effect sensor or other sensor available to those skilled in the art.

Referring to FIG. 1, the sensors S may include a current sensor 80 for obtaining the current signal and a voltage sensor 78 for obtaining the input voltage to the park actuator motor 26. It should be noted that the parameters may be quantified in other ways, including via "virtual sensing" and modeling based on other measurements. For example, current (I) is a function of the winding voltage (U), winding resistance (R), rotor flux constant (λ) and motor speed (ω), such that: $I=[U-(\lambda*\omega)]/R$.

Referring to FIG. 1, the controller C may be in communication with and configured to receive a current signal from a DC motor actuator model 82. The controller C may be in communication and configured to provide pulse-width-modulation (PWM) and direction signals to an H-bridge DC-DC converter 84. As understood by those skilled in the art, an H-bridge is an electronic circuit that switches the polarity of a voltage applied to a load. While the method 100 is described with an H-bridge DC-DC converter 84, it is understood that alternative electronic circuits or components may be employed. Referring to FIG. 1, the controller C may be in communication with a propulsion motor 86 configured to assist the park actuator motor 26 under specific conditions (e.g. high load and/or high grade).

Referring to FIG. 1, the controller C may be configured to communicate with a cloud unit 88 and/or a remote server 90, via a wireless network 92, which may be a short-range network or a long-range network. The remote server 90 may be a private or public source of information maintained by an organization, such as for example, a research institute or a company. The cloud unit 88 may include one or more servers hosted on the Internet to store, manage, and process data. The controller C may be configured to receive and transmit wireless communication to the remote server 90 through a mobile application 94, shown in FIG. 1. The mobile application 94 may in communication with the controller C such that it has access to the data in the controller C. For example, the mobile application 94 may be embedded in a smart phone belonging to a user of the vehicle 12 and plugged or otherwise linked to the vehicle 12. The mobile application 94 may be physically connected (e.g. wired) to the controller C. Alternatively, the mobile application 94 may be embedded in the controller C. The circuitry and components of a mobile application 94 ("apps") available to those skilled in the art may be employed.

The wireless network 92 may be a Wireless Local Area Network (LAN) which links multiple devices using a wireless distribution method, a Wireless Metropolitan Area Networks (MAN) which connects several wireless LANs or a Wireless Wide Area Network (WAN) which covers large areas such as neighboring towns and cities. The wireless network 92 may be WIFI or a Bluetooth™ connection, defined as being a short-range radio technology (or wireless technology) aimed at simplifying communications among Internet devices and between devices and the Internet. Bluetooth™ is an open wireless technology standard for transmitting fixed and mobile electronic device data over short distances and creates personal networks, operating within the 2.4 GHz band. Other types of connections may be employed.

Figure 3:
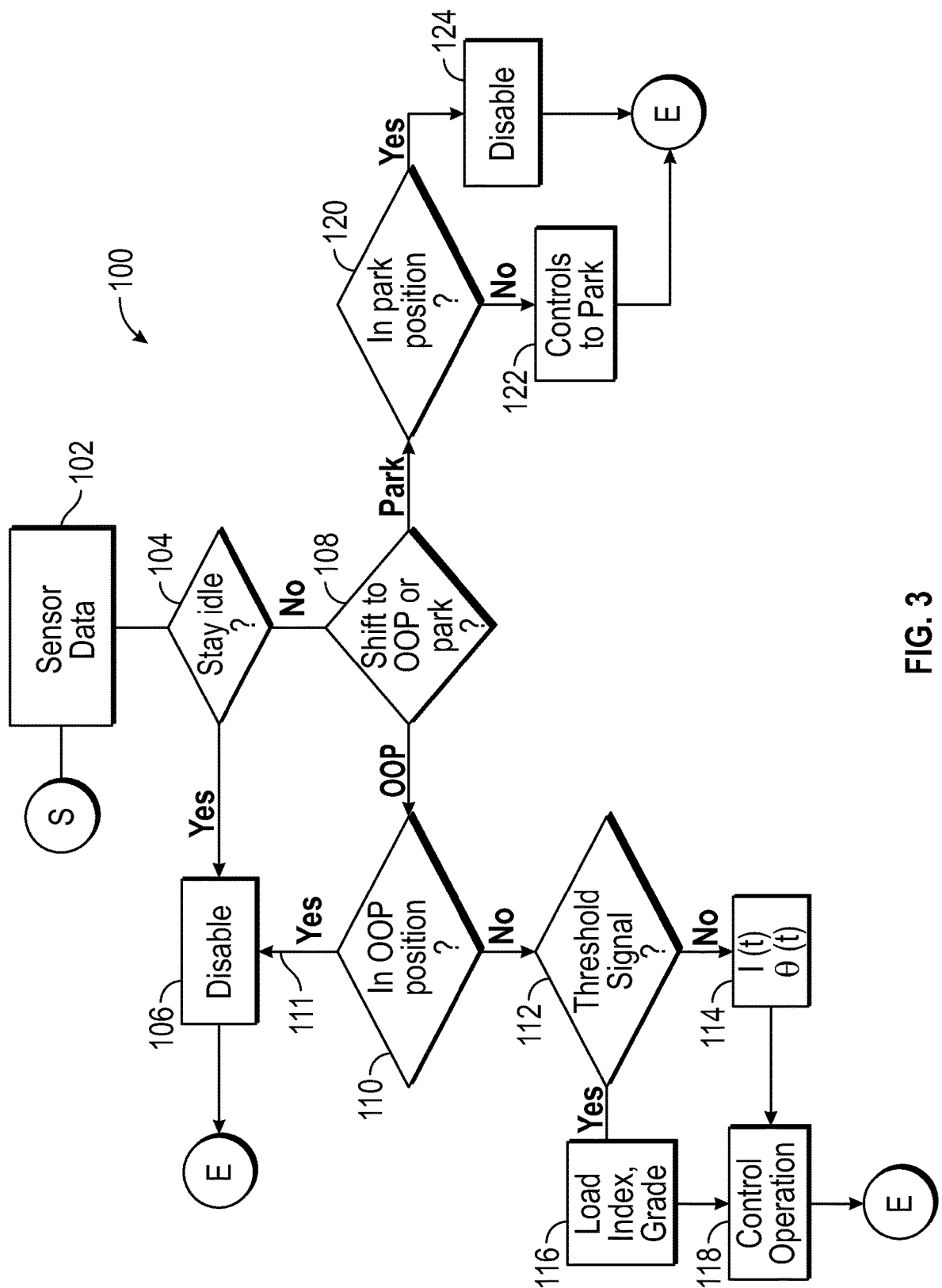
FIG. 3 is a schematic flow diagram of an example method executable by the controller of FIG. 1.

Referring now to FIG. 3, a flowchart of the method 100 is shown. Method 100 may be stored on and executable by the controller C. The method 100 need not be applied in the specific order recited herein and may be dynamically executed. Furthermore, it is to be understood that some steps may be eliminated. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Per block 102 of FIG. 3, the controller C is configured to obtain respective sensor data, via the one or more sensors S. Per block 104 of FIG. 3, the controller C is configured to determine if the vehicle 12 is idle. If so, the H-bridge DC-DC converter 84 is disabled (see block 106) and the method 100 is ended. If not, the method 100 proceeds to block 108, where the controller C is configured to determine whether a shift command to the out-of-park mode 20 has been received.

If a shift command to the out-of-park mode 20 has been received, the method 100 proceeds to block 110, where the controller C is configured to determine if the current position 44 (see FIG. 2B) of the park actuator motor 26 has reached the out-of-park position 45. If so, as indicated by line 111, the H-bridge DC-DC converter 84 is disabled, the PWM duty cycle is set to zero and the method 100 ended. If the park actuator motor 26 is in the process of but has not fully reached the out-of-park position 45, the method 100 proceeds to block 112.

Per block 112 of FIG. 3, the controller C is configured to obtain at least one dynamic parameter associated with the park actuator motor 26, directly via the one or more sensors S or indirectly (e.g. modeled). An input voltage signal in real-time is also obtained. In one example, a motor position signal $\theta(t)$ is selected as the dynamic parameter, where t designates time. In another example, a current signal I(t) is selected as the dynamic parameter. Also, per block 112, the controller C is configured to determine if at least one of a predefined motor position threshold ($\theta_0$) (see graph 206 in FIG. 5) or a predefined time threshold ($T_0$) (see graph 200 and graph 212 in FIG. 4) is reached. In a non-limiting example, the predefined motor position threshold ($0_o$) may be set to 10 degrees.

If the predefined time threshold or the predefined motor position threshold has not been reached, the method 100 proceeds to block 114, where the controller C is configured to set the PWM duty cycle to 100% and set the direction of the H-bridge. Per block 114, the controller C is configured to store the dynamic parameter, this step being repeated until the predefined time threshold or the predefined motor position threshold is reached and the method 100 proceeds to block 118.

Figure 5:
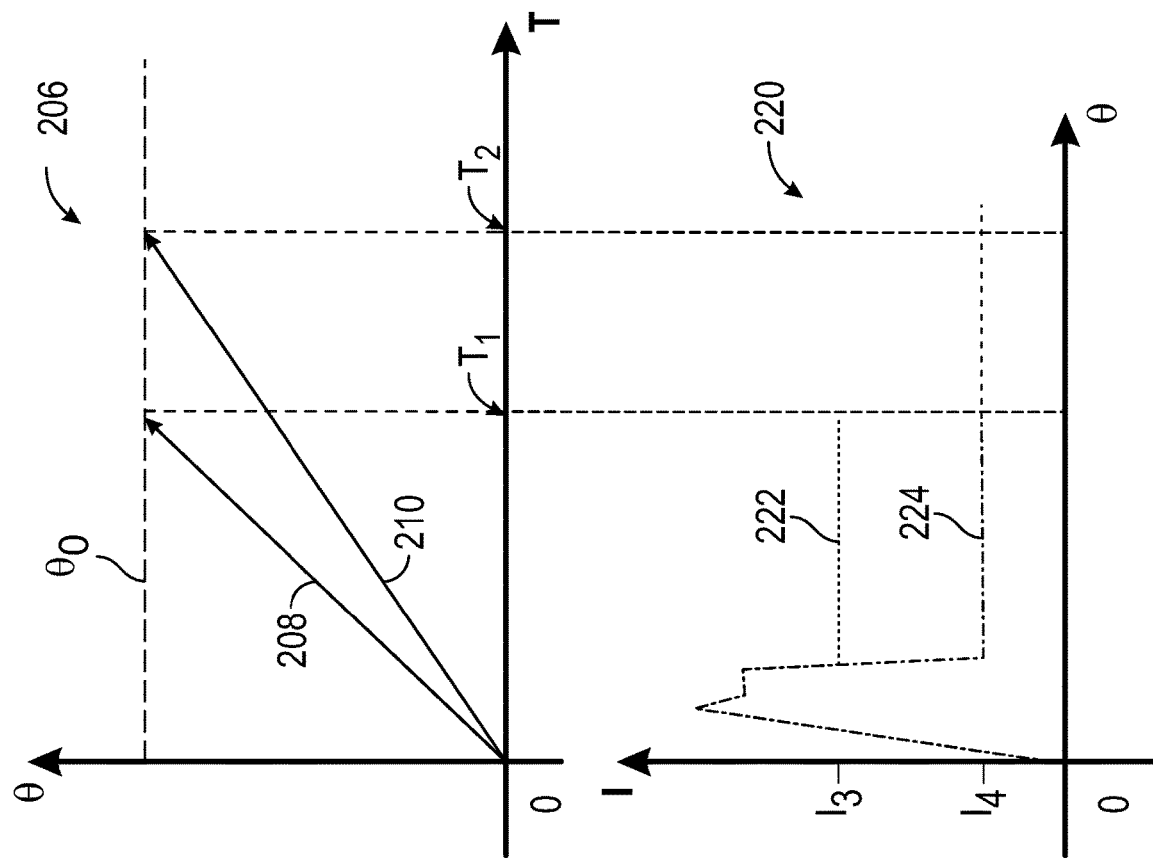
FIG. 5 shows a second set of calibration graphs for the system of FIG. 1.
Figure 4:
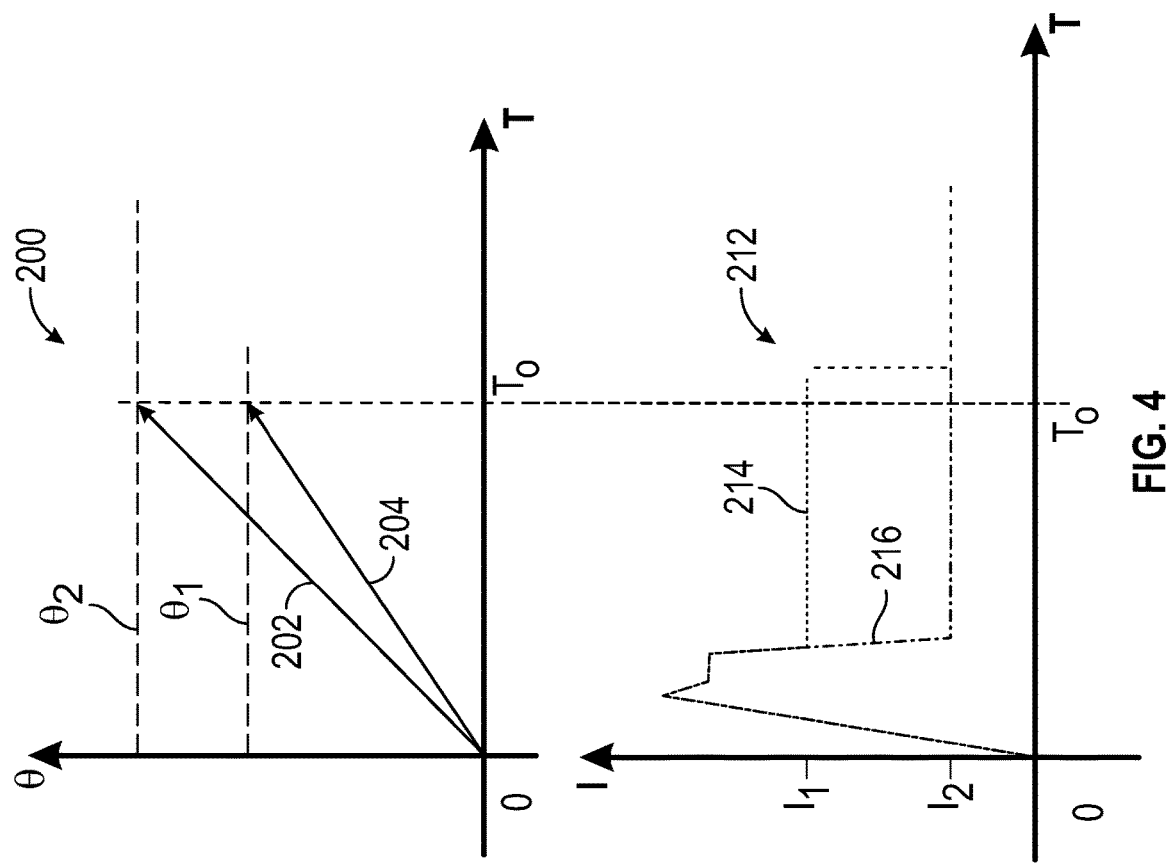
FIG. 4 shows a first set of calibration graphs for the system of FIG. 1.

Per block 116 of FIG. 3, the controller C is configured to determine a load factor based on the dynamic parameter over time when the predefined threshold has been reached. When the dynamic parameter is the motor position signal $\theta(t)$, the load factor L may be represented as an integration of the motor position signal over time: $[L=-\int_0^{T_0}\theta(t)\,dt\,]$, where $T_0$ is the predefined time threshold. When the dynamic parameter is the current signal I(t), the load factor L may be represented as: $[L=-\int_0^{T_0}I(t)\,dt]$. Additionally, a steady state current signal may be used as an index for the load factor. The load factor may be normalized to the input voltage signal. The load factor may be calibrated using calibration datasets, examples of which are shown in FIGS. 4 and 5 and described below. A timer or time counter [e.g. T(t)] may be employed for the predefined time threshold $T_0$ and other time parameters.

Also, per block 116 of FIG. 3, the controller C may be configured to obtain a grade G (see FIG. 1) for the vehicle 12 in real-time based at least partially on the load factor and a weight of the vehicle 12. The grade G may be obtained from the relationship: [L=W*Sine G], where L is the load factor and W is the weight of the vehicle 12.

Per block 118 of FIG. 3, the controller C is configured to follows its designated control protocol for the out of park mode 20. Additionally, per block 118, the controller C is configured to control operation of the vehicle 12 based at least partially on the load factor from block 116. In one example, the controller C may be configured to generate a diagnostic signal when the load factor is below the first calibrated threshold. The diagnostic signal may include an alert sent to a driver, owner or fleet manager of the vehicle 12. The alert may be sent to the remote server 90 via the wireless network 92 and/or the mobile application 94. The controller C may be configured to determine if the load factor is below a second calibrated threshold, the second calibrated threshold being less than the first calibrated threshold.

The controller C may activate a propulsion motor 86 (see FIG. 1) available to those skilled in the art to assist the park actuator motor 26 when the load factor is below the second calibrated threshold. In another example, the load factor may be consumed by other modules accessible to the controller C, such as a soft-landing module configured to adjust control parameters to realize a relatively soft landing.

Referring to block 108 of FIG. 3, if a shift command to the out-of-park mode 20 has not been received, the method 100 proceeds to block 120, where the controller C is configured to determine if the park actuator motor 26 is in the park position 42. If so, per block 124, the H-bridge DC-DC converter 84 is disabled and the PWM duty cycle set to zero. If not, per block 122, the controller C follows its designated control protocol for the park mode 18 and the method 100 is ended.

FIGS. 4 and 5 illustrate examples of calibration datasets. Referring now to FIG. 4, graph 200 shows the motor position (θ) on the vertical axis and time (T) on the horizontal axis. Trace 202 reflects the motor positions for a relatively light load and trace 204 reflects the motor positions for a relatively heavy load. When the predefined time threshold ($T_0$) is reached, the relatively heavy load reaches a first motor position ($θ_1$) while the relatively light load reaches a second motor position ($θ_2$) that is farther from the first motor position ($θ_1$), as shown in graph 200.

For illustration purposes, two traces are shown in each graph, however, each calibration dataset may include numerous traces with available load information. The load factor may be interpolated or extrapolated based on the calibration datasets. For example, obtaining a motor position at the predefined time threshold ($T_0$) for a test load and linearly interpolating between the two traces nearest to the motor position traces having available load information.

Referring now to FIG. 5, graph 206 shows a motor position (θ) on the vertical axis and time (T) on the horizontal axis. Trace 208 reflects the motor positions for a relatively light load and trace 210 reflects the motor positions for a relatively heavy load. To reach the predefined motor position threshold ($θ_0$), the relatively light load takes a first time ($T_1$) and the relatively heavy load takes a second time ($T_2$) that is longer from the first time ($T_1$), as shown in graph 206.

Graph 212 of FIG. 4 shows current (I) on the vertical axis and time (T) on the horizontal axis, aligned with graph 200. Trace 214 reflects the current drawn by a relatively heavy load and trace 216 reflects the current drawn by a relatively light load. When the predefined time threshold ($T_0$) is reached, the relatively heavy load draws a first current ($I_1$) compared to the relatively light load which draws a second current ($I_2$), which is less than the first current ($I_1$).

Graph 220 of FIG. 5 shows current (I) on the vertical axis and position (θ) on the horizontal axis. Graph 220 is aligned with graph 206. Trace 222 reflects the current drawn by a relatively heavy load and trace 224 reflects the current drawn by a relatively light load. To reach the predefined motor position threshold ($θ_0$), the relatively heavy load draws a higher current ($I_3$) compared to the relatively light load which draws a lower current ($I_4$). For graph 220, a steady state current may be used as an index for the load factor. As noted above, the calibration datasets may be created with multiple such traces with available load information.

In summary, the system 10 (via execution of the method 100) provides a host of advantages: minimizing noise and vibration and allowing the vehicle 12 to achieve consistent shift times despite load and voltage variations. Additionally, the system 10 (via execution of the method 100) eliminates the need for an inertial measurement unit for assessing grade. Accordingly, the system 10 and method 100 improve the functioning of the vehicle 12.

The flowchart in FIG. 3 illustrate an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based energy management systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file energy management system, an application database in a proprietary format, a relational database energy management energy management system (RDBMS), etc. Each such data store may be included within a computing device employing a computer operating system such as one of those mentioned above and may be accessed via a network in one or more of a variety of manners. A file system may be accessible from a computer operating energy management system and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method for controlling operation of a vehicle having a park assembly, one or more sensors and a controller having a processor and a tangible, non-transitory memory, the method comprising:
   positioning a park actuator motor in the park assembly, the park actuator motor having an actuator shaft and the vehicle having a park mode and an out-of-park mode;
   rotating the park actuator motor from a park position to an out-of-park position when a shift command to the out-of-park mode is received by the controller;
   determining if the park actuator motor has reached the out-of-park position when the shift command is received, via the controller;
   obtaining and storing at least one dynamic parameter associated with the park actuator motor prior to the park actuator motor reaching the out-of-park position, via the controller;
   determining a load factor based on the at least one dynamic parameter when at least one of a predefined time threshold or a predefined motor position threshold is reached, via the controller; and
   controlling operation of the vehicle based at least partially on the load factor, via the controller.

2. The method of claim 1, wherein controlling operation of the vehicle includes:
   determining if the load factor is below a first calibrated threshold, via the controller; and
   generating a diagnostic signal when the load factor is below the first calibrated threshold, via the controller.

3. The method of claim 2, wherein controlling operation of the vehicle includes:
   determining if the load factor is below a second calibrated threshold, the second calibrated threshold being less than the first calibrated threshold, via the controller; and
   activating a propulsion motor to assist the park assembly when the load factor is below the second calibrated threshold, via the controller.

4. The method of claim 1, further comprising:
   selecting a motor position signal as the at least one dynamic parameter, via the controller, the load factor being an integration of the motor position signal over time.

5. The method of claim 1, further comprising:
   selecting a current signal as the at least one dynamic parameter, via the controller, the load factor being at least one of an integration of the current signal over time or the current signal in steady state.

6. The method of claim 1, further comprising:
   obtaining a grade for the vehicle in real-time based at least partially on the load factor and a weight of the vehicle, via the controller.

7. The method of claim 1, wherein the vehicle includes a transmission output shaft, the method further comprising:
   mounting a park gear on the transmission output shaft and mounting a detent member on the actuator shaft;
   coupling a park pawl to the detent member, the park pawl being configured to selectively engage with the park gear; and
   engaging the park pawl with the park gear when the park actuator motor is in the park position and disengaging the park pawl from the park gear when the park actuator motor is in the out-of-park position.

8. The method of claim 7, further comprising:
   obtaining an input voltage signal to the park actuator motor, via the controller; and
   normalizing the load factor to the input voltage signal, via the controller.

9. A vehicle having a park mode and an out-of-park mode, the vehicle comprising:
   a park assembly including a park actuator motor having an actuator shaft;
   one or more sensors configured to obtain respective sensor data relative to the park assembly;
   a controller in communication with the one or more sensors and having a processor and a tangible, non-transitory memory on which is instructions are recorded;
   wherein the park actuator motor is configured to move from a park position to an out-of-park position when a shift command to the out-of-park mode is received by the controller;
   wherein execution of the instructions by the processor causes the controller to:
      determine if the park actuator motor has reached the out-of-park position when the shift command is received;
      obtain and store at least one dynamic parameter associated with the park actuator motor prior to the park actuator motor reaching the out-of-park position, via the one or more sensors;
      determine a load factor based on the at least one dynamic parameter over time when at least one of a predefined time threshold or a predefined motor position threshold is reached; and
      control operation of the vehicle based at least partially on the load factor.

10. The vehicle of claim 9, wherein controlling operation of the vehicle includes configuring the controller to:
    determine if the load factor is below a first calibrated threshold; and
    generate a diagnostic signal when the load factor is below the first calibrated threshold.

11. The vehicle of claim 10, wherein controlling operation of the vehicle includes configuring the controller to:
    determine if the load factor is below a second calibrated threshold, the second calibrated threshold being less than the first calibrated threshold; and
    activate a propulsion motor to assist the park assembly when the load factor is below the second calibrated threshold.

12. The vehicle of claim 9, wherein the controller is configured to:
    select a motor position signal as the at least one dynamic parameter, the load factor being an integration of the motor position signal over time.

13. The vehicle of claim 9, wherein the controller is configured to:
    select a current signal as the at least one dynamic parameter, the load factor being at least one of an integration of the current signal over time or the current signal in steady state.

14. The vehicle of claim 9, wherein the controller is configured to:
    obtain a grade in real-time based at least partially on the load factor and a weight of the vehicle.

15. The vehicle of claim 9, further comprising:
a detent member mounted on the actuator shaft, the detent member being operatively connected to a transmission output shaft;
a park gear mounted on the transmission output shaft;
a park pawl configured to selectively engage with the park gear; and
wherein the park pawl is configured to engage with the park gear when the park actuator motor is in the park position and the park pawl is configured to disengage from the park gear when the park actuator motor is in the out-of-park position.

16. The vehicle of claim 9, wherein the controller is configured to:
obtain an input voltage signal to the park actuator motor; and
normalize the load factor to the input voltage signal.

\* \* \* \* \*